United States Patent [19]

Peiler et al.

[11] 4,177,821
[45] Dec. 11, 1979

[54] FEED ROTOR FOR AN AXIAL FLOW ROTARY COMBINE

[75] Inventors: Rolf W. Peiler, East Moline; Ronald E. Rohren, Moline, both of Ill.

[73] Assignee: Deere & Company, Moline, Ill.

[21] Appl. No.: 901,325

[22] Filed: May 1, 1978

[51] Int. Cl.² ............................................. A01F 12/22
[52] U.S. Cl. ............................. 130/27 T; 130/27 HA
[58] Field of Search ............ 56/14.6; 130/27 R, 27 H, 130/27 HA, 27 P, 27 Q, 27 T

[56] References Cited

U.S. PATENT DOCUMENTS

| 3,256,887 | 6/1966 | Ausherman | 130/27 R |
| 3,297,037 | 1/1967 | Ausherman | 130/27 R |
| 3,572,346 | 3/1971 | Knapp et al. | 130/27 T |
| 3,982,549 | 9/1976 | DePauw et al. | 130/27 HA |
| 4,003,384 | 1/1977 | Komancheck et al. | 130/27 T |

*Primary Examiner*—Russell R. Kinsey

[57] ABSTRACT

The feeding system for an axial flow rotary combine in which the separator is disposed generally fore-and-aft includes a dual auger feeder house in which a pair of side-by-side upwardly and rearwardly inclined augers are driven in such directions that a major part of the crop material handled is conveyed in a concentrated high speed stream between the augers and delivered in undershot fashion to be engaged by a separator infeed rotor for transfer downstream to a coaxial threshing section. In the preferred embodiment the infeed rotor and its housing are generally frusto-conical in form, the rotor including a frusto-conical core carrying four equally spaced axially extending tapered feed bars, each bar having a ramp-like cross section, with the rotationally leading edge of the ramp radially closer to the rotor axis than the trailing edge. Each bar carries towards its trailing edge a set of angled material control blades which engage the crop material and contribute to its rotational acceleration and, in cooperation with helically arranged lead members on the inside of the infeed housing, displace the material axially as it is carried around the housing. The feed rotor core is relatively small so that the form of the rotor creates ahead of each feed bar a relatively deep fluted pocket or receiving zone with a converging trailing portion (due to the backward sloping ramp of the feed bar). The gentle engagement of crop material provided first by the ramp and then by the slippage-permitting angled blades transforms the flow of crop material from a concentrated linear stream, dispersing it into a rearwardly spiraling annulus, around the periphery of the rotor.

25 Claims, 8 Drawing Figures

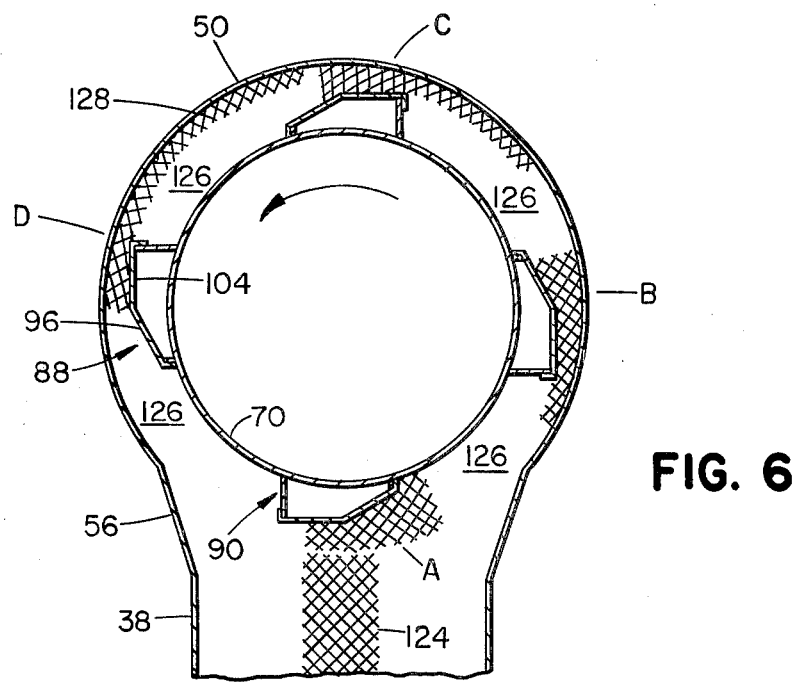
FIG. 6
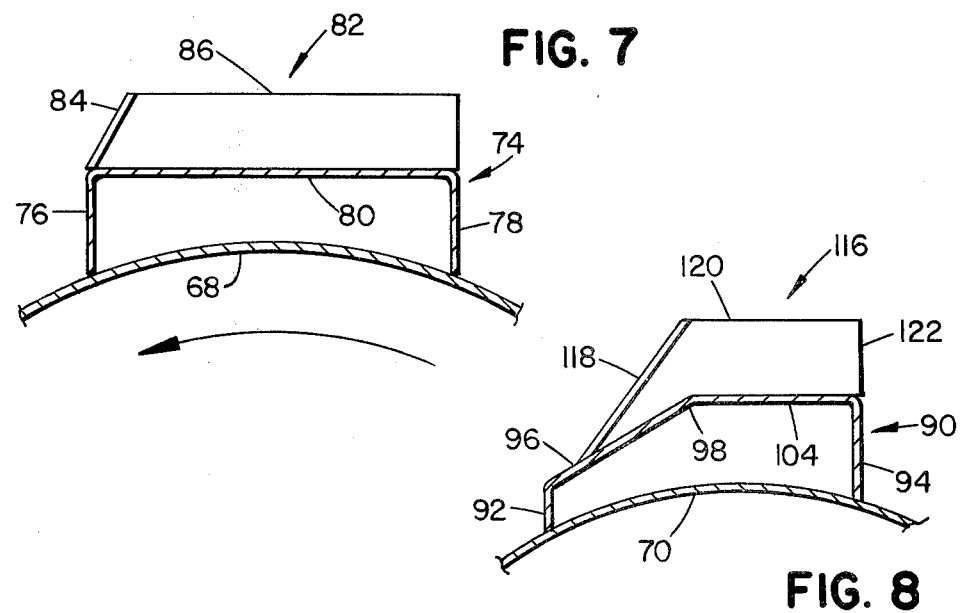
FIG. 7
FIG. 8

FEED ROTOR FOR AN AXIAL FLOW ROTARY COMBINE

BACKGROUND OF THE INVENTION

The present invention relates generally to axial flow rotary combines for harvesting and treating crop material and particularly to a feed rotor for the separator of such a machine.

It is well known that in a combine having an axial flow rotary separator and particularly one with a fore-and-aft axis that the transfer of harvested crop material from a gatherer to the first crop treating portion of the separator (usually a threshing portion) is difficult to achieve efficiently involving, as it does generally, a rapid change of speed and direction of the material. Typically, crop material is delivered to the separator by a feeder house conveyor upwardly and rearwardly in a fore-and-aft direction at relatively low speed and the separator rotor is provided with a special forward feed rotor portion for receiving the material and transferring it rearwardly and spirally into the threshing portion. In a feeding system, the material is generally confined within housings or casings including typically, first that of the feeder house and subsequently a transition housing (between feeder house and separator), a separator infeed housing and finally the casing (with grates) of the separator proper.

The difficulties of achieving an efficient transfer of crop material from the gatherer to the separator in axial flow combines are indicated by the many patents directed to this area issuing in recent years. Attempts to provide an efficient separator feeding system have included: variations in the positional relationships of feeder house conveyor discharge and rotor, including undershot and end-feeding arrangements; variations in the shape of the transitional housing between feeder house and infeed housing of the separator; and variations in the form of the separator rotor infeed portion itself. Also, as described in co-pending U.S. patent application Ser. No. 889,626, also assigned to the assignee of the present invention, a special rotor transition portion may be provided between rotor feed and threshing portions to better condition the incoming crop material for reception by the threshing portion.

Typically, feed rotors have consisted of a core on which are mounted sets of two or more generally helical flights and variations have included forwardly inclining such flights with respect to direction of rotation and forming the forward end of such blades to have a scooping effect to make the acceptance of the crop material by the rotor more positive. A variety of combinations of helical flighting and cylindrical and frustoconical forms for the core of the feed rotor have also been proposed. However, typically in these variations, a continuous flighting form is retained, uninterrupted over the length of the rotor feed portion and resulting in an abrupt shearing effect and very rapid acceleration of the material as it leaves the feeder house conveyor and encounters the feed rotor flighting. The result is extra grain damage and chaff generation and undesirably high torque peaks in the separator and feeder house drive systems. These effects are magnified when the feed rotor flighting is of extended pitch or inclined in the direction of rotation. Such flighting offers a wall to the crop material and no direct diversion outwards into a radial mat as is desirable to prepare it for reception by the threshing section. Further and typically, there is slippage between the crop material and the feed rotor (the average rotational velocity of the crop material never reaches that of the rotor) and circumferential friction between crop material and the sharp edges of the rotor flighting as the material rides over those edges increases power consumption. The power consumption of the feeder house may also be increased by the "chopping" action of an aggressive feed rotor which may actually offer a fluctuating impedance to the flow of material from the feeder house.

SUMMARY OF THE INVENTION

Accordingly, an object of the present invention is to provide a feed rotor or rotor feed portion for an axial flow rotary separator that accepts the discharge from a feeder house in a smooth and uniform manner and transforms a near linear flow of received material into a spiral flow peripheral to the rotor for reception as an annular mat by the next downstream stage of a separator.

It is a feature of the invention to provide a rotor configuration which defines between circumferentially spaced material control elements or feed bars a crop material reception space or chamber of sufficient radial depth and circumferential extent to accommodate crop material as delivered from a feeder house conveyor without back feeding and without undue compression. The rearward (with respect to rotor rotation) boundary of each reception space is substantially defined by the ramp-like leading surface of a feed bar, so that crop material engaged by the feed bar is accelerated circumferentially in a smooth and gentle fashion, the inevitable and desirable slippage which occurs between the material and the feed bar surface resulting in the material being urged radially outwards and into increasing contact with the housing, including lead members carried inside the housing, resulting in downstream displacement of the material as it is progressively dispersed from the reception spaces.

It is another feature of the invention that a helically disposed member or members, such as a series of axially spaced blades, may be provided on such feed bars, spaced and angled so as to engage crop material already in contact with a feed bar and in part supplement or replace the axial displacement action of lead members which may be carried on the inside of the feed rotor housing. Such blades, because of their interrupted nature and the spaces between them, have a combing effect which makes an important contribution to the conditioning of the crop material and its gradual distribution peripherally into an annular mat.

Yet another feature of the invention is to provide a rotor feed portion in which a feed bar has a downstream end at least partially in axial alignment with the upstream end of a threshing bar of a contiguous threshing section.

An advantage of the feed rotor of the invention is that although it is adaptable to a wide variety of feeder house configurations, it is particularly suitable for use in conjunction with a dual auger feeder house (of the type disclosed in co-pending U.S. patent application Ser. No. 736,440 and now U.S. Pat. No. 4,087,953 also assigned to the assignee of the present invention) which tends to deliver material in a concentrated high speed stream, usually rearwardly and upwardly.

Another feature of the invention is that the feed bar may have a trailing portion or surface which may extend nearly circumferentially and carry at least a part of one or more of the angled blades mentioned above, such a surface helping to stabilize the attenuated annular mat formed by the ramp (and angled blades if present).

A particular advantage of the feed rotor of the invention is that the large receding crop material contacting surface of the ramp of the feed bar allows the rotor to engage crop material with less impact than conventional rotors, reducing power consumption and grain damage and resulting in less chopping and chaff generation and hence the delivery of longer straw into the separator. The latter characteristic is particularly valuable when handling crops such as rice, the straw of which has low structural integrity compared with some other grain crops.

A further advantage of the feed rotor of the invention is that the angled blades with which the feed bars may be provided themselves have a threshing effect so that the threshing process of the separator begins in the feed rotor section, potentially shortening the threshing section proper and reducing the total power consumption of the separator.

Another advantage of the invention is that a feed rotor combining a ramp-action feed bar and a preceding crop receiving space is adaptable to a variety of overall configurations including generally cylindrical and frusto-conical, while the feed bar itself may be disposed either axially or somewhat helically on the rotor frame or body.

BRIEF DESCRIPTION OF THE DRAWINGS

FIG. 6 is a diagrammatic representation of material flow from the feeder conveyor through the separator infeed portion including a schematic transverse cross section of the separator infeed portion.

FIG. 7 is a transverse sectional view of a threshing bar approximately on line 7—7 of FIG. 3.

FIG. 8 is a transverse view of a feed bar approximately on line 8—8 of FIG. 3.

DESCRIPTION OF THE PREFERRED EMBODIMENT

Figure 1:
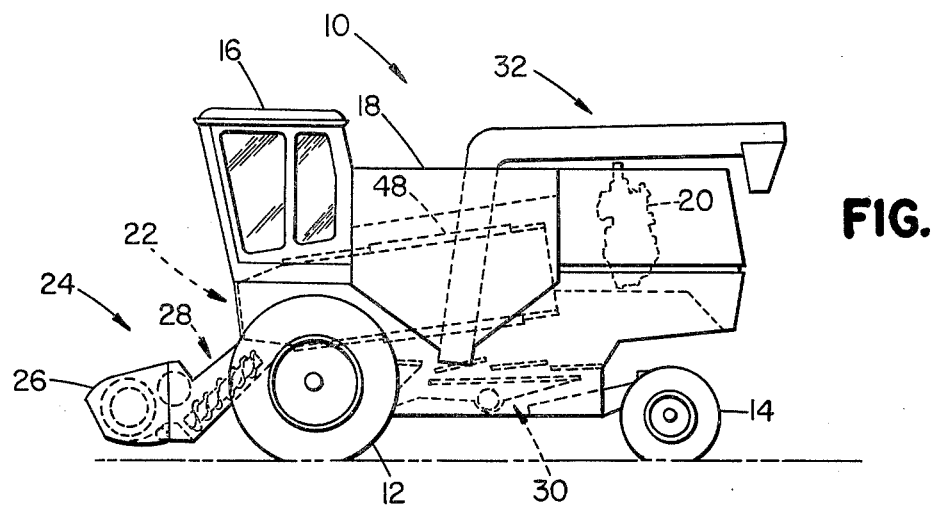
FIG. 1 is a semi-schematic side elevation of a combine embodying the invention.

The invention is embodied in a self-propelled axial flow combine of the type illustrated in FIG. 1. The combine includes a main separator body 10 supported on a pair of forward drive wheels 12 and steerable rear wheels 14 and includes a forwardly mounted operator's station 16, a grain tank 18 straddling the body behind the operator's station 16 and an engine 20 mounted towards the rear of the body 10 for propelling the combine over the ground and driving all its components.

An axial flow separator 22 is carried towards the forward end of the body with its longitudinal axis extending approximately fore-and-aft and lying in the plane of the fore-and-aft center line of the combine body 10. A forwardly mounted header 24 for gathering crop material from a field and delivering it to the separator 22 includes a conventional gatherer such as a cutting platform 26 and a feeder conveyor such as the dual auger feeder conveyor 28 shown in the drawings. A cleaner 30, carried in the lower central part of the combine body 10, receives separated grain and chaff from the separator and delivers clean grain to the grain tank 18 by conventional means (not shown). Clean grain is unloaded from the combine tank by an unloading conveyor system 32.

Figure 2:
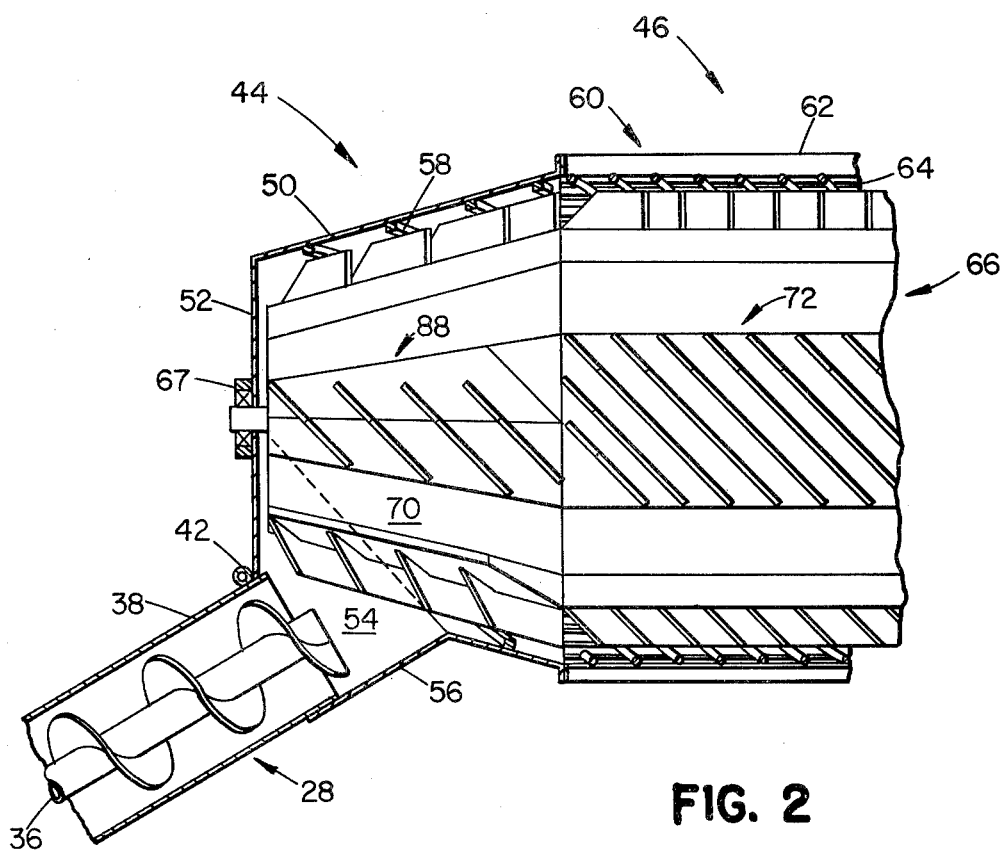
FIG. 2 is an enlarged cut-away side view of the feeder conveyor and the forward part of the axial flow separator of the combine of FIG. 1.
Figure 4:
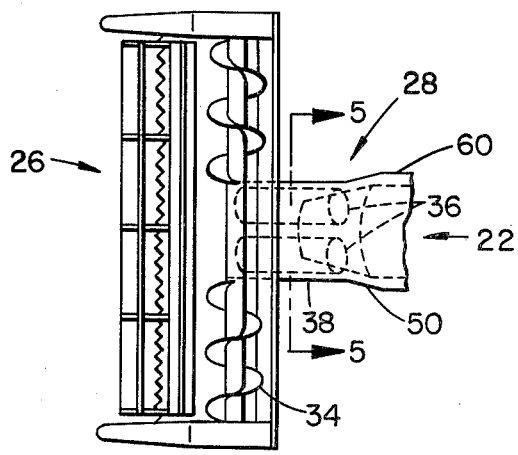
FIG. 4 is a semi-schematic partial top view showing the relationship between the gatherer, feeder conveyor and separator feed portions of the combine of FIG. 1.
Figure 5:
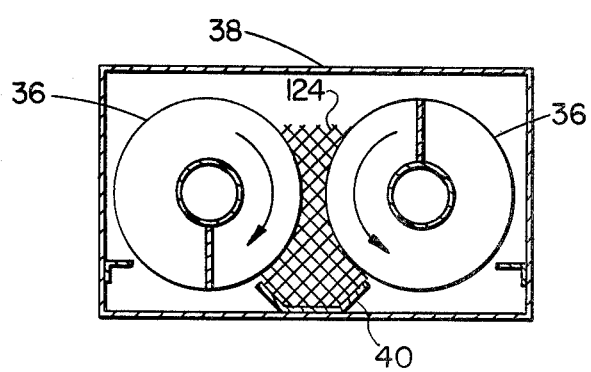
FIG. 5 is an enlarged schematic cross sectional view of the feeder conveyor on line 5—5 of FIG. 4.

A cutting platform auger 34 delivers harvested crop material to the feeder conveyor 28 which includes, for a conveying element and as indicated in FIGS. 4 and 5, a pair of side-by-side contra-rotating rearwardly and upwardly inclined conveyor augers 36 supported within a housing 38 of generally rectangular cross section and including a central stripper 40 carried on the floor of the housing. The header 24 is connected to the forward end of the separator 22 by a transverse pivot 42 adjacent the rearward upper end of the conveyor housing 38 (FIG. 2). A pair of hydraulic cylinders (not shown) extend between the combine frame and the header 24 for selectively pivoting the header about the pivot 42 to adjust the height of the cutting platform 26 above the ground.

The separator 22 includes a forward or upstream infeed portion 44 and a threshing portion 46 immediately downstream of it (FIG. 2). A separating portion 48, not shown in detail in the drawings and indicated only in FIG. 1, constitutes the remaining (downstream) portion of the separator.

The separator infeed portion 44 includes a frusto-conical housing wall 50 and a forward wall or closure 52. An opening 54 in the forward lower portion of the frusto-conical housing wall 50 communicates with the feeder conveyor housing 38 by means of a transition housing 56, shown only partially in FIG. 2, rigidly connected between the frusto-conical 50 and front 52 walls and overlapping the feeder conveyor housing 38 so as to accommodate the relative movement which occurs between them when the height of the cutting platform 26 is adjusted and the feeder conveyor 28 pivots about pivot 42. A dual auger feeder conveyor and transition housing of similar configuration and principal of operation is fully described in co-pending U.S. Pat. No. 4,087,953 also assigned to the assignee of the present invention. Mounted on the inside of the frusto-conical wall 50 are a series of helical lead bars 58.

Rigidly attached to and extending rearward from the infeed housing frusto-conical wall 50 is a generally cylindrical threshing grate 60 including a series of circumferentially spaced longitudinally extending spacer bars 62 supporting a series of rods 64 extending spirally and disposed substantially radially inside the bars 62, so that a relatively smooth surface is offered to the flow of crop material.

Figure 3:
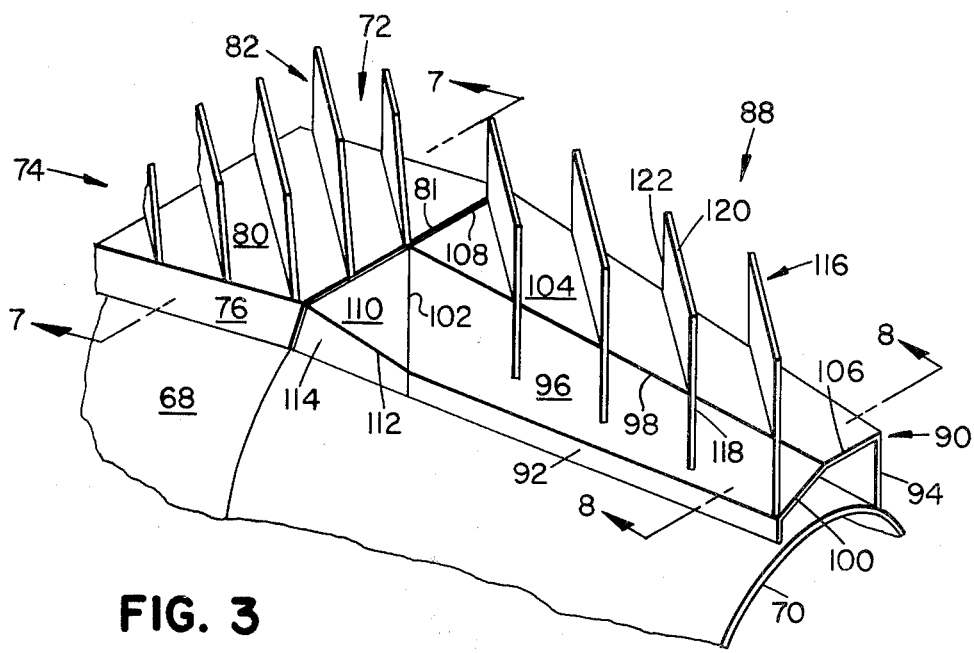
FIG. 3 is a three-quarter right front perspective partial view of the separator rotor showing a feed bar and adjacent threshing bar.

The separator 22 also includes a rotor 66 extending substantially the length of the separator, supported for rotation by conventional bearing means at each end (only a forward bearing 67 being shown) and driven by conventional means (not shown). The rotor 66 includes main cylindrical portion 68 and forward frusto-conical 70 body or frame portions. The forward end of the cylindrical portion 68 is aligned axially with the forward end of the threshing grate 60 and carries four equally circumferentially spaced fore-and-aft extending threshing bars 72 (FIGS. 3 and 7). Each bar includes a formed body or support 74 having upright leading and trailing (with respect to rotor rotation) walls 76 and 78, respectively, and a floor portion 80, extending between the radially outward edges of the walls 76 and 78, and disposed tangentially with respect to the cylindrical periphery of the rotor and having a transverse upstream edge 81. Each bar 72 carries a series of axially spaced parallel radially extending threshing blades 82, each blade being mounted helical fashion with respect to the rotor axis and having a rearwardly and outwardly sloping leading edge or shin 84 and a radially outward working edge 86 approximately parallel to the floor 80.

The frusto-conical rotor body portion 70 extends within the frusto-conical infeed housing portion 50 and carries a series of four equally circumferentially spaced fore-and-aft extending feed bar assemblies 88, each assembly being longitudinally aligned with a threshing bar assembly 72 (FIG. 3). Each feed bar assembly 88 includes a tapered formed sheet metal feed bar body 90 increasing in width from front to rear, the overall width at the rear being approximately equal to the width of the threshing bar body 74. The feed bar body 90 includes leading and trailing (with respect to rotor rotation) walls 92 and 94 by which the feed bar is attached to the frusto-conical rotor body 70. The leading wall 92 is much shorter than the trailing wall 94 and a ramp portion 96 slopes backwards and outwards from the outer edge of the wall 92, its trailing edge being defined by a fore-and-aft extending bend line 98, its upstream end by a transverse edge 100 and its downstream end by a diagonal bend line 102, the bend lines 98 and 102 forming an apex and meeting the threshing bar floor 80 at the transverse mid-point of its forward edge 81. Trailing the ramp 96 and extending tangentially (with respect to the frusto-conical periphery of the infeed rotor) from the bend line 98 to meet the upper edge of the trailing wall 94 is a feed bar floor surface or portion 104 having a transverse upstream edge 106 aligned the ramp upstream edge 100 and a downstream edge 108 meeting and parallel with the forward edge 81 of the threshing bar floor 80. Extending between the diagonal bend line 102 and the leading portion of the threshing bar floor upstream edge 81 is a triangular transition ramp 110 having a leading edge 112. A generally upright filler wall 114 extends between the edge 112 and the frusto-conical body 70 and (axially) between the downstream end of the feed bar leading wall 92 and the upstream end of the threshing bar leading wall 76.

Mounted on each feed bar assembly 88 are a series of angled axially spaced radially extending feed bar blades 116, each blade having a backwardly sloping leading edge or shin 118 and a working edge 120 parallel to the feed bar floor 104 and an approximately upright trailing edge 122 (FIG. 8). As can be seen in FIGS. 2 and 3, the blades 116 are carried principally on the feed bar trailing floor portion 104 but they do extend a short distance over the ramp surface 96.

In operation, as the combine advances over a field, crop material is harvested by the cutting platform 26, gathered to the center of the platform by the platform augers 34 to be received by the feeder conveyor 28. The high-speed contra-rotating augers 36 of the feeder conveyor 28 convey the bulk of the crop material in a concentrated stream 124 somewhat as indicated by the central shaded portion in FIG. 5 and deliver it, undershot fashion to the separator feed portion 44. The capability of the feed rotor of the invention for accommodating a relatively concentrated high speed stream of material makes it particularly compatible with a dual auger feeder conveyor as in the present embodiment but it will be appreciated that it is also well adapted to accept a more diffuse delivery as, for example, from a conventional chain and slat feeder conveyor.

As is indicated in FIG. 6, the construction of the rotor feed portion provides relatively deep pockets or receiving or charging spaces 126 between the feed bars 88 so that the rotor can accept crop material from the feeder conveyor without any back feeding or back pressure on the feeder conveyor itself. As delivered to the feed rotor, the stream of crop material 124, of course, has principally linear motion in a rearward and upward direction but as soon as it is engaged by the feed rotor surfaces rotational acceleration begins. The receding ramp surfaces 96 and the backward sloping leading edges 118 and angled disposition of the blades 116 ensure that the first contact between the material and the rotor is relatively gentle so that there is a minimum of chopping of straw, grain damage and chaff generation. At the same time, due to the inertia of the material and to friction between it and the housing surfaces, there is relative motion or slippage between the material and the rotor as well as the housing and the angled blades 116 of the feed bars and the helical lead members 58 of the housing 50 cooperate to index the crop material axially rearward for eventual delivery to the threshing portion 46 of the separator 22. In the frusto-conical feed portion of the present embodiment centrifugal action plus the downstream directed divergence of the housing 50 also imposes an axial indexing force on the crop material.

FIG. 6 depicts diagrammatically the transformation of the flow of crop material from a rearwardly and upwardly directed stream 124 into a rotating annular mat 128. It is assumed that the combine is being operated at near its maximum material handling capacity and that each receiving space 126 in the feed rotor receives a charge of material as it rotates through the stream of material 124 being delivered from the feeder conveyor sufficient to load the feed bar assembly 88 following it (condition A in FIG. 6). The flow of material is continuous of course but for this description it is convenient to isolate a charge of crop material and follow it downstream through stages A, B, C and D; but this is purely diagrammatic and it is not suggested that the figure accurately represents the progressive dispersion of the received material in relation to angular displacement of the rotor. As indicated at A, the material has encountered the large contacting surface of the ramp 96 and slippage is occurring so that the material is being dispersed into the space between the floor 104 of the feed bar and the housing 50. This process continues as the charge of material is propelled spirally downstream through stages B, C and D and eventually the charge is fully attenuated and dispersed into an annular and peripheral mat 128, a portion of which is indicated by the letter D in FIG. 6.

As the crop material is propelled through the infeed portion of the separator, it is accelerated circumferentially but never reaches the peripheral speed of the rotor and the continuing slippage which occurs includes rubbing of crop material over the working edges 120 of the feed bar blades 116 and between those edges and the housing helical lead bars 58 beginning a threshing action which becomes more significant as the material approaches the threshing portion proper 46 of the separator and dispersion into a thinner mat progresses and more material is exposed to direct contact with the edges 120. The axial alignment of the feed bar 88 with the threshing bar 72 of course assists in feeding material into the threshing zone in that there is no exposed threshing bar end to obstruct flow but such alignment is not essential to the function of the feed bar itself. It is highly desirable, however, so that efficient operation of the separator may be achieved and the possibility of blocking reduced, that, as the feed bar of the present invention provides, dispersion of the material into an annular mat be completed before it reaches the threshing portion proper.

It will be appreciated that the mode of operation of the feed rotor of the invention is such as to permit its embodiment in a variety of forms, for example, in rotors of overall cylindrical or converging frusto-conical configurations as well as the diverging frusto-conical form described here. But, of course, appropriate clearances must be maintained between housing and feed bar so that they can cooperate to maintain material control. It will be seen too, that there is no requirement for the feed bar to be only axially extending. A feed bar may be aligned somewhat helically so that the ramp surface itself may contribute to downstream axial displacement. Again, it can be seen that any one feed bar need not extend the full length of the rotor feed portion. It should be understood too that mounting the feed bars on a continuous frusto-conical surface is a convenient form of construction but the conical surface is not intended to make any essential contribution to the function of the feed bars. Feed bars according to the invention function equally well when carried on an open frame, for example, supported on spokes attached to a central hub.

It is preferred to make the width of the feed bar 88 at its downstream end about equal to the width of the threshing bar 72. A preferred width for the feed bar in its main or downstream portion is about one-third of the rotor diameter at that point with a circumferential space between bars of the same order. For a given rotor diameter, these considerations will help determine the number of bars to be used. The general aspect or angularity of the ramp-like surface 96 may be defined in relation to a circumferentially extending tangent to the rotor periphery at a given point adjacent, say, the trailing portion of the surface (e.g. the bend line 98). A preferred angle of depression of the ramp surface 96 from such a tangent is about 30° to 40° for the main or downstream portion of the bar although, in a modification not shown in the drawings, this angle may be increased substantially adjacent the upstream end of the rotor, at least in part to maintain adequate capacity in the material receiving pocket 126 between the feed bars. As for the feed bar blades 116, good results have been obtained with blades having a radial height of about 25 millimeters towards their trailing edge 122 operated in an infeed housing 50 proportioned so that radial clearance between blades 116 and lead bars 58 is about 12 millimeters.

We claim:

1. In an axial flow rotary separator for treating agricultural crops in which a rotor rotates within a housing and in which crop material is introduced into an annular space between rotor and housing, rotor and housing cooperating as the rotor rotates to treat the crop material and propel it downstream in a generally spiral path, said separator including a threshing section, an improved separator feed section upstream of the threshing section, comprising:

an infeed housing having a wall including a crop receiving opening and a plurality of helically disposed lead members carried internally by the housing wall; and a rotor feed portion having a frame, supported for rotation and axially extending in the housing and including a plurality of raised approximately axially extending feed bars carried by the frame, circumferentially spaced and defining between them crop receiving spaces and each having an axially elongated ramp-like surface including, with respect to rotor rotation, leading and trailing portions, said trailing portion being at a greater radial distance from the rotor axis than the leading portion so that crop material introduced to the feed section through the crop receiving opening and entering the crop receiving spaces is engaged by the feed bars and propelled circumferentially, inertia of the material and friction between it and the housing causing relative circumferential motion, the material riding up the ramp and being urged radially outwards and dispersed and forming an attenuated annular mat while engagement by the helical lead members deflects the crop material downstream towards the threshing section.

2. The invention defined in claim 1 wherein the ramp-like surface, at least towards the downstream end of the feed bar is inclined to a radial of the rotor passing adjacent the trailing portion of the surface not less than 45° as measured in the plane perpendicular to the axis of the rotor.

3. The invention defined in claim 1 wherein said trailing portion includes a floor surface extending approximately circumferentially and trailing the ramp-like surface.

4. The invention defined in claim 3 and further comprising a plurality of axially spaced helically angled raised blades carried by the feed bar for cooperating with the feed bar and the housing to control and convey crop material.

5. The invention defined in claim 4 wherein at least some of the blades extend at least partially over the floor surface.

6. The invention defined in claim 1 and further comprising a material conveying element carried by the frame and operatively associated with the feed bar, said conveying element having a radially outward approximately helically disposed working edge disposed at least partially in a trailing position relative to the ramp-like surface for engaging crop material and contributing to its downstream displacement.

7. The invention defined in claim 1 and further comprising a plurality of spaced material control blades mounted on the feed bar ramp-like surface and helically disposed for engaging crop material and contributing to its downstream displacement.

8. The invention defined in claim 7 wherein at least some of the material control blades are mounted generally towards the trailing portion of the ramp-like surface.

9. The invention defined in claim 1 wherein the threshing section of the separator includes a plurality of threshing bars carried by the rotor, each bar having an upstream end and each feed bar includes a downstream end, the downstream end of at least one feed bar being approximately longitudinally aligned with the upstream end of a threshing bar.

10. The invention defined in claim 1 wherein both the infeed housing and the rotor feed portion are generally frusto-conical in form.

11. The invention defined in claim 10 wherein the respective cone angles of the infeed housing and the rotor feed portion are approximately equal.

12. The invention defined in claim 10 wherein the rotor feed portion frame includes a frusto-conical surface and the feed bars are carried by said surface.

13. In a combine having a forward mounted gatherer for gathering crop material from a field, a frame and a generally fore-and-aft extending axial flow rotary separator supported by the frame and including a separator housing and a separator rotor rotatable within the housing, said separator having a forward annular inlet, a crop feeding system for receiving crop material from the gatherer and transferring it to the separator comprising:

a feed rotor rotatably supported by the frame forwardly adjacent to and coaxial with the separator rotor, said feed rotor including a frame and a plurality of raised feed bars carried by the frame and circumferentially spaced so as to define between them crop receiving spaces, each feed bar including an axially elongated ramp-like surface having, with respect to rotor rotation, leading and trailing portions respectively, said surface being disposed so that the trailing portion is at a greater radial distance from the rotor axis than the leading portion so that the ramp-like surface has a backward and outward slope;

an infeed housing supported by the combine frame and surrounding the feed rotor so as to define an axially extending annular passage between housing and rotor having a rearward end registering with the separator annular inlet and said housing including a wall having a feed opening;

conveying means within the annular passage for engaging the crop material and urging it rearward; and a feeder conveyor carried by the combine frame and including a rearwardly and upwardly extending conveying element and a housing surrounding the conveying element and having a forward inlet in a crop receiving relationship with the gatherer and a rearward outlet in a crop delivery relationship with the feed opening of the infeed housing wall, said feeder house being operable to receive crop material from the gatherer and transfer it through the infeed housing opening to enter the crop receiving spaces and to be engaged by the feed bars, the feed bars imparting circumferential motion to the material but inertia of the material and friction between it and the housing causing relative circumferential motion between the material and the feed rotor so that the ramp-like surfaces of the feed bars urge the material radially outwards as it is propelled rearwards by the conveying means so that material received from the feeder conveyor with generally upwards and rearwards linear motion is delivered by the feed rotor to the separator annular inlet in a rotating peripheral mat.

14. The invention defined in claim 13 wherein the conveyihg element comprises a pair of side-by-side contra-rotating augers.

15. The invention defined in claim 13 wherein the feed opening is substantially beneath the feed rotor so that delivery to the feed rotor is undershot.

16. The invention defined in claim 13 wherein each feed bar substantially spans the axial extent of the feed rotor.

17. The invention defined in claim 13 wherein the conveying means within the annular passage includes a plurality of axially spaced helically angled approximately radially extending blades carried by at least one of the feed bars.

18. The invention defined in claim 13 wherein the conveying means within the annular passage includes a plurality of fixed, raised helical lead bars carried on the infeed housing wall.

19. The invention defined in claim 13 wherein the ramp-like surface is generally plane and the trailing portion also includes a generally plane surface extending in a trailing relationship with the ramp-like surface and disposed more nearly tangentially with respect to the feed rotor than the ramp-like surface.

20. An axial flow rotary separator for a combine in which crop material is treated while being propelled spirally downstream comprising:

an elongated housing having an upstream inlet for receiving crop material; and a rotor, rotatably mounted and axially extending within the housing so as to define an axially extending annular passage communicating with the inlet, and including a threshing portion having a plurality of rasp bars spanning the axial extent of the threshing portion and disposed to move in a crop threshing relationship with the housing as the rotor rotates and a feed portion co-axial with and upstream of the threshing portion and including a plurality of raised feed bars substantially spanning the axial extent of the feed portion and circumferentially spaced so as to define between them charging spaces for receiving crop material entering the separator through the inlet and each bar having, with respect to rotor rotation, an anterior ramp-like surface sloping backwards and outwards and having leading and trailing edges so that as the rotor rotates, crop material received in the charging spaces is propelled circumferentially by the feed bars, friction between the material and the housing and inertia of the material causing the circumferential speed of the material to be less than the rotor peripheral speed resulting in relative circumferential motion between material and rotor so that material riding against the ramp-like surface is urged outwards and dispersed over the trailing edge of the ramp-like surface while being propelled spirally downstream.

21. The invention defined in claim 20 wherein the angle of depression between the ramp-like surface adjacent its downstream end and a plane circumferentially tangential to the rotor periphery at the trailing edge of the ramp-like surface is not more than 45°.

22. The invention defined in claim 20 wherein the upstream end of at least one rasp bar is approximately longitudinally aligned with a downstream end of one of the feed bars.

23. The invention defined in claim 20 and further including a plurality of axially spaced helically angled raised material control blades carried by the feed bars.

24. The invention defined in claim 20 and further including a plurality of raised helical lead bars carried on the inside of the housing.

25. The invention defined in claim 20 wherein each feed bar also includes a trailing floor contiguous with the trailing edge of the ramp-like surface and having a backward and outward slope less than that of said surface.

* * * * *